United States Patent [19]

Syme et al.

[11] Patent Number: 5,733,624
[45] Date of Patent: Mar. 31, 1998

[54] MINERAL FIBER INSULATION BATT IMPREGNATED WITH COEXTRUDED POLYMER LAYERING SYSTEM

[75] Inventors: Robert W. Syme, King City, Canada; Gary E. Romes, Cincinnati, Ohio; Joseph T. Church, Memphis, Tenn.; Steven Sanford, Albion, Mich.

[73] Assignee: Guardian Fiberglass, Inc., Albion, Mich.

[21] Appl. No.: 684,463

[22] Filed: Jul. 22, 1996

[51] Int. Cl.⁶ .......................................... B32B 1/04
[52] U.S. Cl. .................. 428/68; 428/74; 428/121; 428/126; 428/131; 428/34.5; 428/34.7; 442/174; 442/180; 442/62; 442/398; 442/412; 52/404.1; 52/406.2
[58] Field of Search .................. 428/68, 74, 34.6, 428/34.5, 34.7, 131, 136, 121; 52/407, 408; 442/327, 398, 412, 62, 174, 180

[56] References Cited

U.S. PATENT DOCUMENTS

| | | |
|---|---|---|
| 3,546,846 | 12/1970 | Sens . |
| 3,616,185 | 10/1971 | Goldberg . |
| 4,420,521 | 12/1983 | Carr . |
| 4,927,705 | 5/1990 | Syme et al. . |
| 4,968,556 | 11/1990 | Jain . |
| 5,211,988 | 5/1993 | Morton . |
| 5,240,527 | 8/1993 | Lostak et al. . |
| 5,277,955 | 1/1994 | Schelhorn et al. . |
| 5,318,644 | 6/1994 | McBride et al. . |
| 5,350,477 | 9/1994 | Chevalier et al. . |
| 5,362,539 | 11/1994 | Hall et al. . |
| 5,435,963 | 7/1995 | Rackovan et al. . |
| 5,466,504 | 11/1995 | Gavin et al. . |

*Primary Examiner*—Patrick Ryan
*Assistant Examiner*—J. M. Gray
*Attorney, Agent, or Firm*—Myers Liniak & Berenato

[57] ABSTRACT

A mineral fiber (e.g. fiberglass) thermal insulation batt is disclosed wherein a base mineral fiber layer is impregnated with a two-layer layering system so as to produce a batt which is substantially vapor impermeable with a perm vapor rating less than about one. The first layer of the layering system is of a low melt material while the second layer is of a high melt material, the first layer being sandwiched between the base insulating layer and the second layer, and functioning to bond the layering system to the base. In certain embodiments, the first layer includes quick blooming ethyl vinyl acetate (e.g. from about 10–25%) and a low density (e.g. 22–26 lbs. per cubic foot) polyethylene, and the second layer includes high density (e.g. 28–38 lbs. per cubic foot) polyethylene. The resulting insulation batt is vapor impermeable, less susceptible to cold-crack, easier to manufacture, a better fire retardant, more durable, and easier to handle.

20 Claims, 4 Drawing Sheets

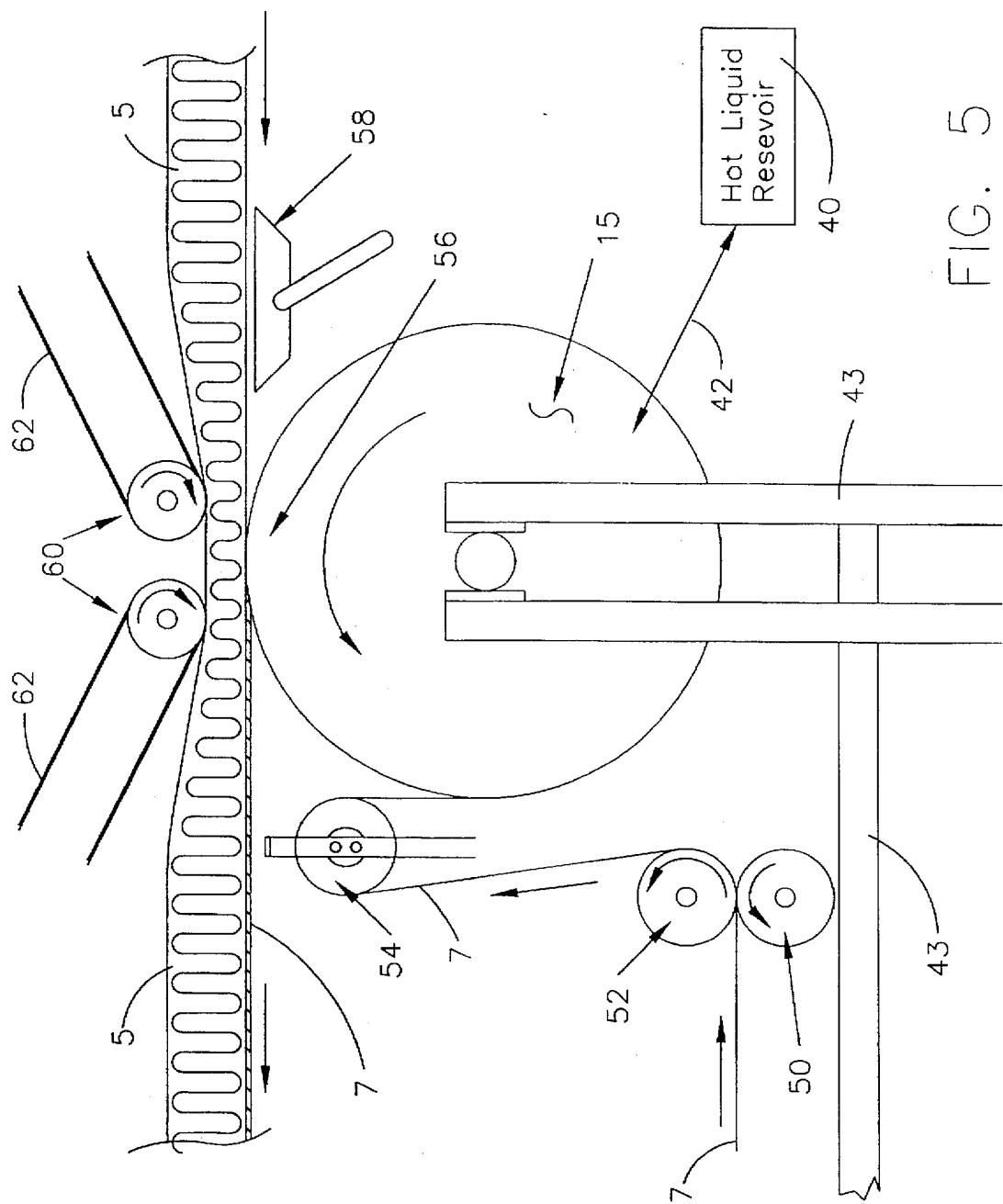

MINERAL FIBER INSULATION BATT IMPREGNATED WITH COEXTRUDED POLYMER LAYERING SYSTEM

This invention relates to a mineral fiber insulation batt impregnated with a vapor impermeable layering system. More particularly, this invention relates to a fiberglass thermal insulation batt impregnated with a coextruded vapor impermeable polymer layering system including a first layer and a second layer, wherein the first layer has a melting point substantially lower than the second layer and is sandwiched between the fiberglass base and the second layer. The resulting insulation batt is vapor impermeable with a perm rating less than about one, has a much improved fire rating, improved durability, is light weight, easy to handle, less susceptible to cold-crack, and more efficient to manufacture. According to certain embodiments, the first layer of the layering system includes both low density polyethylene and ethyl vinyl acetate while the second layer includes high density polyethylene.

RELATED APPLICATIONS

This application is related to an application filed simultaneously herewith entitled METHOD OF MAKING MINERAL FIBER INSULATION BATT IMPREGNATED WITH COEXTRUDED POLYMER LAYERING SYSTEM Ser. No. 08/686,049, pending.

BACKGROUND OF THE INVENTION

Mineral fiber insulation batts coated with kraft paper and the like are old and well-known. Examples of mineral fiber include fiberglass, rock wool, etc. Typically, the base mineral fiber insulation is processed along an endless conveyor system and a sheet(s) of kraft paper is adhered to at least one surface of the insulation. The resulting batts coated with kraft paper are typically used for insulating vertical wall cavities and the like. Unfortunately, such batts suffer from the following problems: i) they lack durability and are susceptible to damage (e.g. tearing) at job sites; ii) their vapor retardation characteristics are less than desirable in a perfect world; iii) paper burns; iv) its aesthetic appearance is less than desirable to many in the trade; and v) cost of paper. Accordingly, there exists a need in the art to improve upon the above-listed drawbacks of kraft paper coated mineral fiber batts.

U.S. Pat. No. 5,362,539 discloses a mineral fiber batt coated with a polyethylene film. Either an adhesive, VELCRO™ (hook and loop fastener), or heat sealing is used to adhere the vapor permeable polyethylene film to the mineral fiber core. Unfortunately, with respect to the use of an adhesive or VELCRO™ (hook and loop fastener) to attach the polyethylene film to the mineral core, these are multiple-step adhering processes for coating the batt with the film. This is both undesirable and inefficient. Additionally, such batts are susceptible to cold-crack at temperatures which range down to about −65° F. Cold-crack often occurs when hot melt adhesives and the like are utilized to adhere laminants together, this often resulting in the laminants prematurely separating. With respect to heat sealing the high density polyethylene film to the mineral fiber core, this results in a less than sufficient attachment of the film to the core.

U.S. Pat. No. 5,277,955 discloses a mineral fiber batt (e.g. fibrous glass wool) coated with a polyethylene layer. The polyethylene layer may be heated for the purpose of joining the film to the mineral fiber batt. It is recognized in the '955 patent that this may not result in an adequate attachment of the film to the batt, as it is advised in the '955 patent to utilize an additional adhesive layer or strip to connect the film to the batt when it is anticipated, for example, that the resulting batt is to be placed in a vertical position between the studs of a wall. As discussed above, the use of such an adhesive layer or strip necessitates additional manufacturing steps, is less efficient, and renders the resulting batt susceptible to cold-crack at low temperatures.

U.S. Pat. No. 4,927,705 to Syme, et al. discloses a polyester fiber batt coated with a layering system including a polyethylene layer and a metalized aluminum layer. Unfortunately, the use of the metalized aluminum coating layer renders this batt difficult to handle and susceptible to job site damage. Additionally, such batts are both difficult and more expensive to manufacture than is desirable. Still further, the batt of the '705 patent includes a plastic fiber base, and many in the industry view the aluminum coating as non-aesthetically pleasing and the plastic polyester fiber base as undesirable.

In view of the above, it will be clear to those of skill in the art that there exists a need for an improved mineral fiber insulation batt which has improved fire resistance, vapor impermeability, is efficient and cost effective to manufacture, has improved durability, easy to handle, is less susceptible to cold-crack, and is aesthetically attractive. It is a purpose of this invention to fulfill the above-described needs in the art as well as other needs which will become apparent to the skilled artisan upon review of this disclosure.

SUMMARY OF THE INVENTION

It is an object of this invention to provide a mineral fiber insulation batt comprising:

a base insulation layer of mineral fiber impregnated with a layering system having first and second layers;

the second layer disposed over the first layer so that the first layer is located between the base mineral fiber layer and the second layer, the first layer having a lower melting point than the second layer; and the first layer including from about 10–25% ethyl vinyl acetate and from about 75–90% low density polyethylene so as to quickly bloom when exposed to heat thereby causing the base insulation layer to become impregnated with the layering system.

According to certain preferred embodiments, the second layer may include one of kraft paper, high density polyethylene, cardboard, and EPT.

According to additional preferred embodiments, the first layer is from about 75–85% polyethylene having a density of from about 22–26 lbs. per cubic foot (lb./ft.$^3$) and a thickness of from about 0.2–12.0 mils (preferably from about 0.2–3.0 mils). According to still further preferred embodiments, the entire coextruded layering system may have a thickness of from about 0.2–12.0 mils.

This invention still further fulfills the above-described needs in the art by providing a fiberglass thermal insulation batt impregnated with a vapor impermeable coextruded layering system on at least one side thereof, the thermal insulation batt comprising:

a fiberglass base layer having a density less than about 6.0 lbs. per cubic foot;

the coextruded layering system including a first layer and a second layer wherein the first layer has a substantially lower melting point and a lesser density than the second layer, the first layer being disposed between the fiberglass base layer and the second layer;

the first layer including from about 10–25% ethyl vinyl acetate and from about 75–90% low density polyethylene;

the second layer including polyethylene and having a density of from about 25–50 lbs. per cubic foot; and wherein the layering system renders the insulation batt substantially vapor impermeable and less susceptible to cold-crack at low temperatures.

According to certain preferred embodiments, the second layer is high density polyethylene having a density of from about 28–38 lbs. per cubic foot and a thickness of less than about 1 mil.

According to still further preferred embodiments, the density of the low density polyethylene in the first layer is from about 22–26 lbs. per cubic foot; and the melting point of the first layer is from about 80°–130° C. and the melting point of the second layer is greater than the melting point of the first layer and above 100° C.

According to further preferred embodiments, the base fiberglass layer has a density of from about 0.3–1.0 lbs. per cubic foot and an R value of at least about R-3.

This invention still further fulfills the above-described needs in the art by providing a method of making a vapor impermeable mineral fiber batt including the steps of providing mineral fiber insulation, coextruding a vapor impermeable layering system including a high melt layer and a low melt layer, and impregnating the mineral fiber core with the layering system by heating same.

This invention will now be described with respect to certain embodiments thereof, accompanied by certain illustrations.

IN THE DRAWINGS

FIG. 5 illustrates schematically the manufacturing of the FIG. 1 batt according to another embodiment.

DETAILED DESCRIPTION OF CERTAIN EMBODIMENTS OF THIS INVENTION

Figure 1:
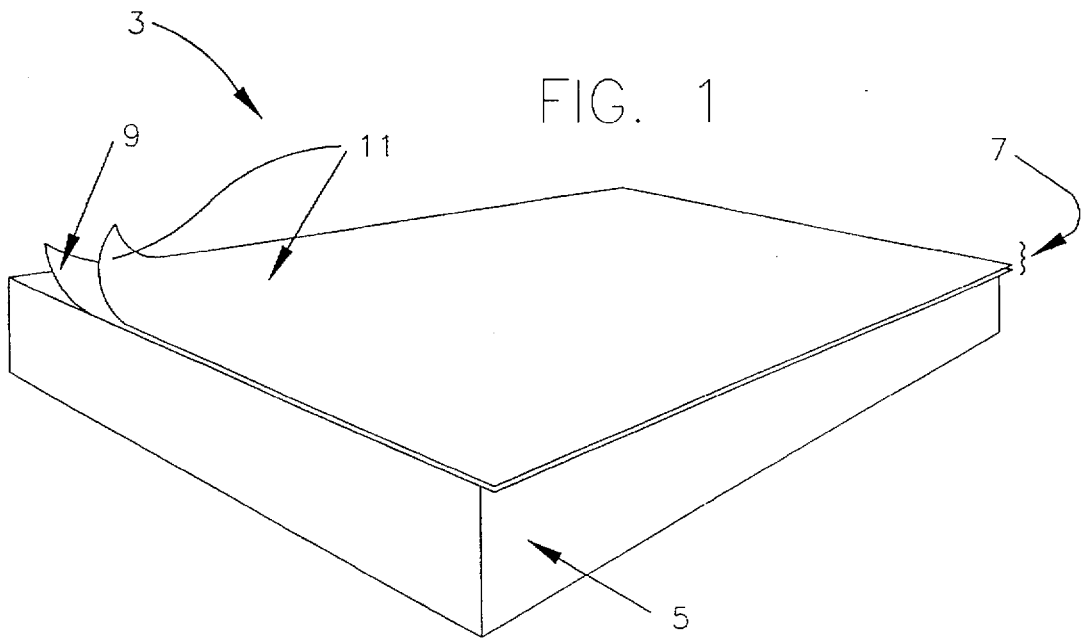
FIG. 1 is a perspective view illustrating a mineral fiber batt according to an embodiment of this invention wherein only one surface of the mineral fiber base is impregnated with a vapor impermeable layering system.

Referring now more particularly to the accompanying drawings in which like reference numerals indicate like parts throughout the several views.

Figure 4:
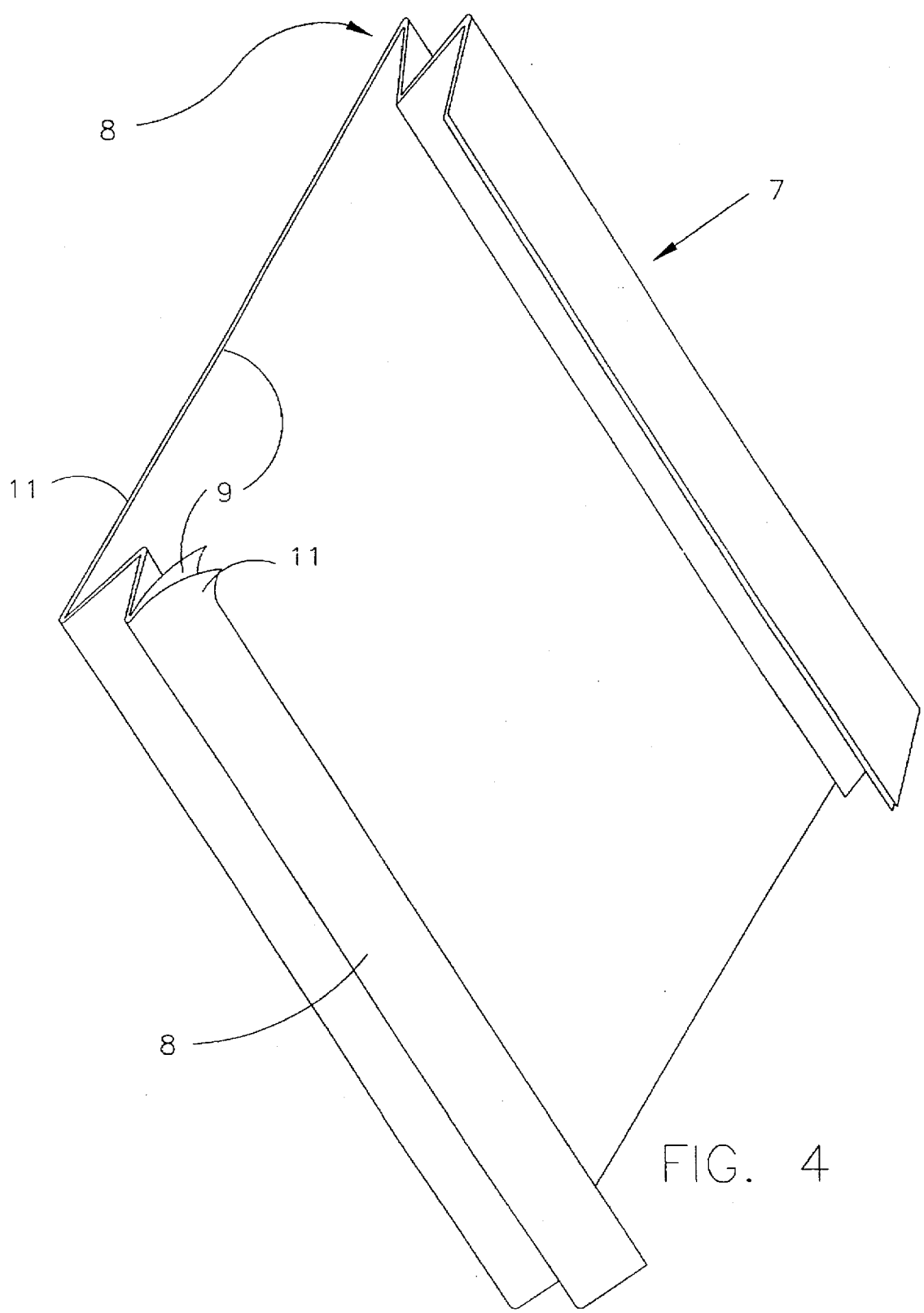
FIG. 4 is a perspective view of the coextruded polymer layering system according to this invention, this view illustrating the double folded stapling flanges of the polymer layering system.

FIG. 1 is a perspective view of thermal insulating batt 3 according to an embodiment of this invention. Batt 3 includes mineral fiber (e.g. fiberglass) base 5 which is impregnated with vapor impermeable layering system 7. Layering system 7 includes first layer 9 and second layer 11, with first layer 9 being sandwiched between mineral fiber base or core 5 and second layer 11. According to the FIG. 1 embodiment, only one side (i.e. the top surface) of mineral fiber (e.g. fiberglass) base 5 is impregnated with the vapor impermeable layering system 7. The phrase "vapor impermeable" as used herein refers to a vapor perm rating of less than about 1. FIG. 4 illustrates an example of layering system 7 according to certain embodiments, including double folded stapling flanges 8 which renders attachment of the batt within vertical wall cavities easier.

According to certain embodiments of this invention, first layer 9 includes a low melt polymer while second layer 11 includes a high melt polymer, these two layers making up coextruded layering system 7. In other words, the melting point of layer 9 is substantially less than the melting point of layer 11. The melting point of first layer 9 may be from about 80°–130° C. according to certain embodiments of this invention, while the melting point of layer 11 (which is greater than that of layer 9) is at least about 100° C.

First layer 9 of layering system 7 includes, according to certain embodiments, a mixture of ethyl vinyl acetate and low density polyethylene. With regard to the respective contents of these materials in layer 9, the ethyl vinyl acetate makes up from about 10–25% by weight of the layer while the low density polyethylene makes up from about 75–85% of layer 9. The density of the polyethylene in layer 9 is from about 22–26 lbs. per cubic foot. According to certain preferred embodiments, layer 9 is made up of about 18% ethyl vinyl acetate and 82% low density polyethylene (i.e. about 18% of the low density polyethylene is made up of a liquid ethyl vinyl acetate additive).

The ethyl vinyl acetate in layer 9 is provided for the purpose of enabling layer 9 to bloom quicker when exposed to heat or radiation so that mineral fiber base 5 may become impregnated with layering system 7. Upon blooming, the ethyl vinyl acetate migrates to the surface of layer 9 closest to mineral fiber base 5 thereby making this surface tacky and permitting the impregnation as will be described later. The counterpart material in layer 9, the polyethylene, is low density (e.g. from about 22–26 lbs. per cubic foot) for the purpose of further facilitating the impregnation of system 7 into the intended surface of mineral fiber base 5.

The other layer 11 in coextruded layering system 7 has a relatively high linear load relative to layer 9 so as to give system 7 improved strength at relatively thin thicknesses. According to certain embodiments, second layer 11 includes a high density polyethylene, having a density of from about 25–50 lbs. per cubic foot, more preferably from about 28–38 lbs. per cubic foot. According to certain alternative embodiments, layer 1 may be of kraft paper, cardboard, EPT, polypropylene, etc. However, it is made clear that the preferred material for layer 11 includes the high density polyethylene. In fact, according to preferred embodiments, the substantial entirety of layer 11 is made up of high density polyethylene in order to give layering system 7 its improved strength. Layer 11 performs the majority (sometimes all) of the vapor impermeability function of system 7.

Prior to application, the thickness of layer 9 is greater than about 0.2 mil and the thickness of high melt layer 11 is greater than about 0.4 mil. One mil is equivalent to 0.001 inches. According to certain embodiments, layer 9 is from about 0.2 to 1.0 mils thick and layer 11 from about 0.4 to 2.5 mils thick. After being heated and applied, layer 9 is embedded within the fibers of base 5 (i.e. impregnation) and thus has a thickness greater than about 0.2 mils while the thickness of layer 11 remains about the same because it does not melt when proceeding around the heated drum or roll.

In order to attach layering system 7 to mineral fiber base layer 5, it is necessary to heat or radiate layering system 7. For example, either a hot roller and/or a radiant heater may be provided adjacent a nip roller for the purpose of heating layering system 7. When system 7 is heated, because layer 9 has a lower melting point than layer 11, layer 9 becomes tacky and impregnates mineral fiber base 5. As discussed above, the ethyl vinyl acetate in layer 9 migrates to the surface of the layer thereby rendering it tacky for the purpose of impregnating base 5. Because layers 9 and 11 are coextruded (i.e. attached to one another), once layer 9 impregnates base 5, the entire layering system 7 becomes attached to the mineral fiber.

As a result of the unique structure described above according to the first embodiment of this invention, insulating batt 3 is improved relative to the prior art in the following respects: i) it is more durable; ii) batt 3 has improved vapor retarding characteristics on the surface to which system 7 is attached; iii) improved fire retarding characteristics; iv) batt 3 is easier to handle and less susceptible to damage at job sites; v) batt 3 is less susceptible to cold-crack; vi) easier and cheaper to manufacture; and vii) batt 3 is more aesthetically attractive than many prior art insulations.

Batt 3 is adapted, for example, to be placed in vertically extending wall cavities between studs in numerous well-known applications (e.g. residential). The vapor impermeable feature of system 7 acts to prevent moisture from entering the insulated structure (e.g. residential home).

According to alternative embodiments of this invention, a surlyn film may be used instead of layering system 7 so as to provide the vapor impermeability to batt 3. Unfortunately, surlyn is relatively expensive and more costly to manufacture than the product described above.

As an example, base 5 of batt 3 may be an R-11 fiberglass batt having a density of about 0.5 lb./ft.$^3$ and a thickness of about 3.5 inches, base 5 including fiberglass held together with a binder of phenolic resin. Pre-application, layer 9 may be about 0.5 mil thick and layer 11 about 1.5 mil thick of heat density polyethylene.

Figure 2:
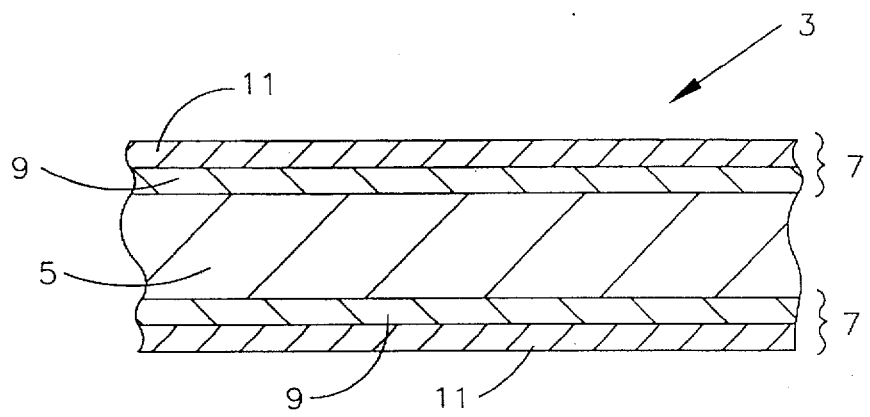
FIG. 2 is a side elevational cross-sectional view of a mineral fiber batt according to another embodiment of this invention wherein two or more sides/surfaces of the mineral fiber base (e.g. fiberglass) are impregnated with the vapor impermeable layering system.

While batt 3 in the FIG. 1 embodiment has only one major surface of mineral fiber 5 impregnated with system 7, the embodiment according to FIG. 2 illustrates multiple sides of mineral fiber base 5 impregnated with layering system 7. According to the FIG. 2 embodiment, as few as two and as many as six sides/surfaces of base 5 may be impregnated with layering system 7.

Figure 3:
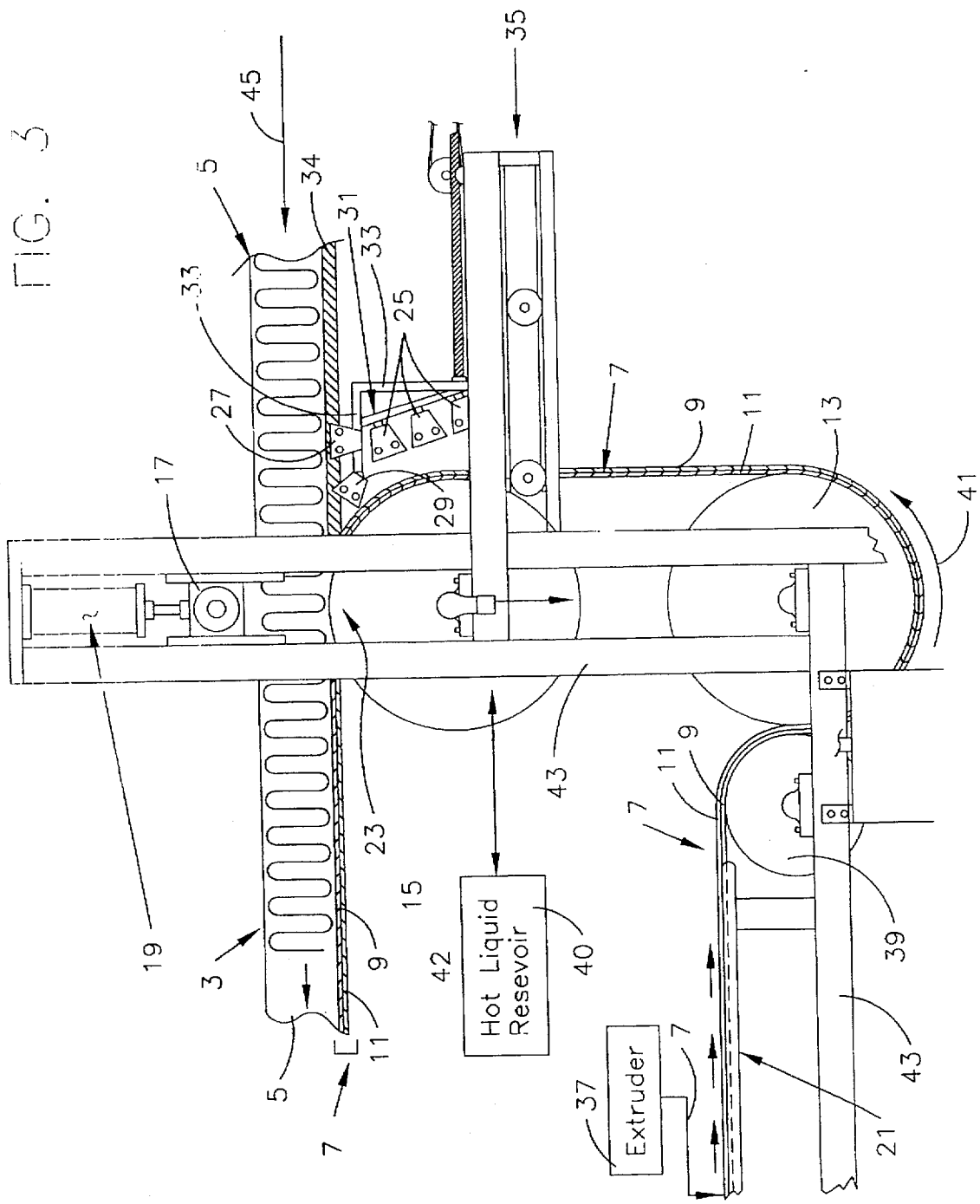
FIG. 3 illustrates schematically the manufacturing/making of the mineral fiber batt of FIG. 1.

FIG. 3 illustrates how thermal insulating batt 3 according to the FIG. 1 embodiment of this invention is made or manufactured according to one embodiment. As shown in FIG. 3, the manufacturing system includes rotating tension drum 13, driven hot roll rotating drum 15 (heated conventionally with oil or water), driven downward biased nip roller 17, hydraulic cylinder 19 for biasing nip roller 17 downward toward laterally moving mineral fiber base 5, guide tracks 21 used in the forwarding or feeding of layer system 7 toward impregnation point or area 23, and optional radiant heaters 25, 27, and 29. Heaters 25 (e.g. IR heaters) are mounted on support 31 for heating system 7 while heaters 27 and 29 are mounted on support member 33 which is attached to 31. Drive system 35 is provided for driving roll 15 and the endless conveyor 34 supplying the continuous layer of mineral fiber 5 to the impregnation station 23.

The manufacture of batt 3 is as follows. From extruder 37, layering system 7 (e.g. see FIG. 4) is coextruded so as to include low melt layer 9 and high melt layer 11. Extruder 37 may be located remote from the manufacturing plant so that the coextruded layering system 7 is supplied to the batt manufacturer in the form of rolls of the coextruded polymer film to be applied to the mineral fiber.

Polymer based layering system 7 is forwarded from its supply (polymer film 7 roll or extruder) 37 to guide tracks 21 where it is conveyed toward roller 39. Layer system 7 passes over top of roller 39 and into the nip between rollers 39 and 13 (at least one of which is driven). Upon exiting the nip between rollers 39 and 13, layering system 7 passes around and underneath of roller 13 as shown by arrow 41. Rollers 13 and 39 are both attached to frame 43.

From the periphery of roller 13, layering system 7 is fed upward toward driven hot roll drum 15. Drum 15 is internally heated in a conventional manner so as to raise the temperature of system 7 when the layering system comes into contact with the roller/drum 15. Optionally, radiant heaters 25 are also mounted adjacent roller 15 for the purpose of further heating layering system 7 so that the ethyl vinyl acetate within layer 9 will migrate to the surface of system 7 for the purpose of facilitating at 23 impregnation into mineral fiber 5. Essentially, drum 15 functions to substantially melt to some extent (not completely) layer 9, but not layer 11. Drum 15 may be oil heated, for example, so that its surface is from about 150° to 500° F., preferably from about 220°–240° F. The heated oil 40 is circulated 42 to and from an oil chamber in double-walled drum 15.

Meanwhile, mineral fiber (e.g. fiberglass) base layer 5 is fed along an endless conveyor belt or the like toward impregnation station 23 as shown by arrow 45. According to certain embodiments, heater 27 is mounted beneath layer 5 for the purpose of heating the mineral fiber just prior to station 23 while heater 29 is utilized for the purpose of heating the impregnation nip at 23 between hot roller 15 and biased nip roller 17. Approaching and exiting impregnation station 23, both mineral fiber 5 and layering system 7 travel at substantially the same speed (e.g. from about 20 ft. per minute up to about 200 ft. per minute, depending upon the application). In order to control the expansion of layering system when heated, the speeds of the rollers in the system are controlled in a predetermined manner. For example, according to certain embodiments, the rear rollers are operated at a faster speed than the nip rollers at station 23 in order to stabilize the layering system 7 when it is heated and shrinkage occurs so as to prevent out-of-control elongation or tearing of the polymers.

Upon reaching the nip at impregnation station 23, the surface of first layer 9 in system 7 closest to mineral fiber 5 has become tacky due to the melting (partial, not complete) occurring of layer 9. When this tacky layer comes into contact with the lower surface of mineral fiber 5 at 23, impregnation of the mineral fiber with layering system 7 occurs. Thereafter, batt 3 (i.e. mineral fiber base 5 with layering system 7 attached thereto) proceeds away from impregnation station 23. At this time, batt 3 cools down and curing occurs so as to solidify the impregnation of system 7 into mineral fiber 5. The end result is a one-step manufacturing process which avoids many of the undesirable requirements found in prior art methods of manufacturing mineral fiber batts.

FIG. 5 illustrates a method of making the FIG. 1 batt according to yet another embodiment of this invention. As shown in FIG. 5, the polymer based layering system 7 (including layers 9 and 11) is fed horizontally toward and through the nip between controlled driven roller 50 and tension control roller 52 (i.e. a pair of tension control rollers). The peripheral surfaces of rollers 50 and 52 rotate in their respective directions (i.e. roller 50 clockwise and roller 52 counterclockwise) at a slightly faster speed than that at which the periphery of roller 15 rotates for the purpose of eliminating "goose-necking" which occurs when film 7 shrinks when heated at the surface of roll/drum 15. Thus, even though shrinking of film 7 occurs, there is no excess build-up or undesirable stretching of film 7 due to the speed at which rollers 50 and 52 are controlled to operate.

From the nip between rollers 50 and 52, layering system 7 is fed upward and around idler roller 54 which rotates in the clockwise direction. The vertical position of idler roller 54 is adjustable so that the system may achieve more contact between layering system 7 and the surface of drum 15 at relatively high running speeds and a lesser amount of contact between system 7 and drum 15 at lower system operating speeds. The up/down vertical position of roller 54 may be adjusted by way of pneumatics or worm gears according to different embodiments of this invention.

From idler roller 54, layering system 7 is fed downward and around the exterior periphery of heated drum roll 15 (e.g. oil heated). The surface of drum roll 15 may be heated to, for example, a temperature of from about 220°–240° F. for the purpose of melting (partially, not fully) layer 9. As layering system 7 (including layers 9 and 11) travels around the surface of heated roll 15 (which rotates in the counter-clockwise direction), layering system 7 comes into contact with the lower surface of mineral fiber 5 at impregnation point 56. Prior to point 56, the mineral fiber (e.g. fiberglass) is heated by IR heater 58 so that the lower surface of mineral fiber 5 is more receptive (i.e. warmer) to impregnation by layer 9 of system 7.

At impregnation point 56, layer 9 of layering system 7 is caused to impregnate mineral fiber 5. Adjustable tractor drives 60 are provided above point 56 for the purpose of exerting downward directed pressure or bias on mineral fiber 5 at point 56 to facilitate the impregnation. The illustrated rollers of tractor drives 60 are driven by external means (not shown), with their respective belts 62 functioning to move mineral fiber 5 horizontally to the left as shown in FIG. 5. Following impregnation at point 56, the insulative batt including fiber 5 impregnated with layering system 7 continues moving to the left while curing (i.e. cooling down to solidify the impregnation).

Once given the above disclosure, many other features, modifications, and improvements will become apparent to the skilled artisan. Such other features, modifications, and improvements are therefore considered to be a part of this invention, the scope of which is to be determined by the following claims.

We claim:

1. A fiberglass insulation batt impregnated with a vapor impermeable coextruded polymeric-based layering system on at least one side thereof, the insulation batt comprising:

a fiberglass base layer having a density less than about 6.0 lbs. per cubic foot and an insulation value of at least R-8;

said coextruded polymeric-based layering system including a first polymeric-based layer and a second polymeric-based layer wherein said first layer has a substantially lower melting point and a lesser density than said second layer, said first layer being disposed between said fiberglass base layer and said second layer, and wherein said fiber glass base layer is impregnated with said coextruded layering system;

said first layer including from about 10–25% ethyl vinyl acetate and from about 75–90% low density polyethylene;

said second layer including high density polyethylene having a density of from about 25–50 lbs. per cubic foot; and wherein said layering system renders at least one surface of the insulation batt substantially vapor impermeable.

2. The batt of claim 1, wherein said second layer is high density polyethylene having a density of from about 28–38 lbs. per cubic foot.

3. The batt of claim 2, wherein both said first and second layers are of a thickness less than about 1.0 mil.

4. The batt of claim 1, wherein said first layer includes from about 75–85% low density polyethylene having a density of from about 22–26 lbs. per cubic foot (lbs./ft.$^3$).

5. The batt of claim 4, wherein said first layer includes from about 15–20% ethyl vinyl acetate, said ethyl vinyl acetate including means for blooming relatively quickly and causing said fiberglass base layer to be impregnated with at least said first layer of said coextruded layering system.

6. The batt of claim 1, wherein the melting point of said first layer in said layering system is from about 80–130° C., and the melting point of said second layer is greater the melting point of said first layer and is above about 100° C.

7. The batt of claim 1, wherein the thickness of said first layer is greater than about 0.2 mil, and the thickness of said second layer is greater than about 0.4 mil.

8. The batt of claim 1, wherein the base fiberglass layer has a density of from about 0.3–6.0 lbs. per cubic foot, and has an R value of at least about R-3.

9. The batt of claim 8, wherein said base fiberglass layer has a thickness of from about 0.3–1.0 inches.

10. The batt of claim 9, wherein said batt has a thickness of from about 0.80–6.0 inches.

11. The batt of claim 1, wherein edges of said layering system are double folded on opposing sides of a surface of the fiberglass and are stapling flanges.

12. A mineral fiber insulation batt comprising:

a base insulation layer of mineral fiber impregnated with a layering system having first and second layers;

said second layer disposed over said first layer so that said first layer is located between said base mineral fiber layer and said second layer, said first layer having a lower melting point than said second layer; and said first layer including from about 10–25% ethyl vinyl acetate and from about 75–90% low density polyethylene so as to quickly bloom when exposed to heat thereby causing said base insulation layer to become impregnated with said layering system.

13. The batt of claim 12, wherein said second layer is formed of one of: kraft paper, polyethylene, and cardboard.

14. The batt of claim 13, wherein said first layer comprises from about 75–85% polyethylene having a density of from about 22–26 lbs. per cubic foot.

15. The batt of claim 13, wherein said first layer if from about 15–20% ethyl vinyl acetate, and has a thickness of from about 0.2–12.0 mils, and wherein said base layer includes fiberglass having a density of from about 0.3–2.0 lbs. per cubic foot.

16. The batt of claim 12, wherein said first and second layers are coextruded, and said second layer has a density of from about 28–38 lbs. per cubic foot and includes polyethylene, and said first layer has a density substantially lower than the density of said second layer.

17. The batt of claim 16, wherein said second layer is entirely of polyethylene having a density of from about 28–38 lbs. per cubic foot.

18. A mineral fiber insulation batt comprising:

a base mineral fiber layer having at least one major surface impregnated by a polymer-based layering system including extruded ethyl vinyl acetate;

the polymer-based layering system including extruded ethyl vinyl acetate impregnating, the one major surface of the mineral fiber layer;

the polymer-based layering system including a first layer including extruded ethyl vinyl acetate and a second polymer-based layer, said first layer impregnating the mineral fiber surface and being located between the mineral fiber and the second layer, and wherein the insulation batt is substantially vapor impermeable.

19. The batt of claim 18, wherein said first and second layers both include polyethylene, and said first layer has a lower melting point than said second layer.

20. A fiberglass insulation batt impregnated with extruded ethyl vinyl acetate (EVA), the fiberglass insulation batt comprising:

a fiberglass base layer having a density less than about 6.0 lbs. per cubic foot and an insulation value of at least R-8, said fiberglass base layer including glass fibers held together with a binder;

extruded ethyl vinyl acetate; and wherein at least one major surface of said fiberglass base layer is impregnated with said extruded ethyl vinyl acetate.

* * * * *